No. 801,150. PATENTED OCT. 3, 1905.
J. A. MURPHY & W. S. MANNING.
PNEUMATIC TIRE.
APPLICATION FILED DEC. 5, 1904.

2 SHEETS—SHEET 1.

Witnesses:
H. L. Sprague
E. L. Smith

Inventors
James A Murphy
William S Manning
by Chapin & Co
Attorneys.

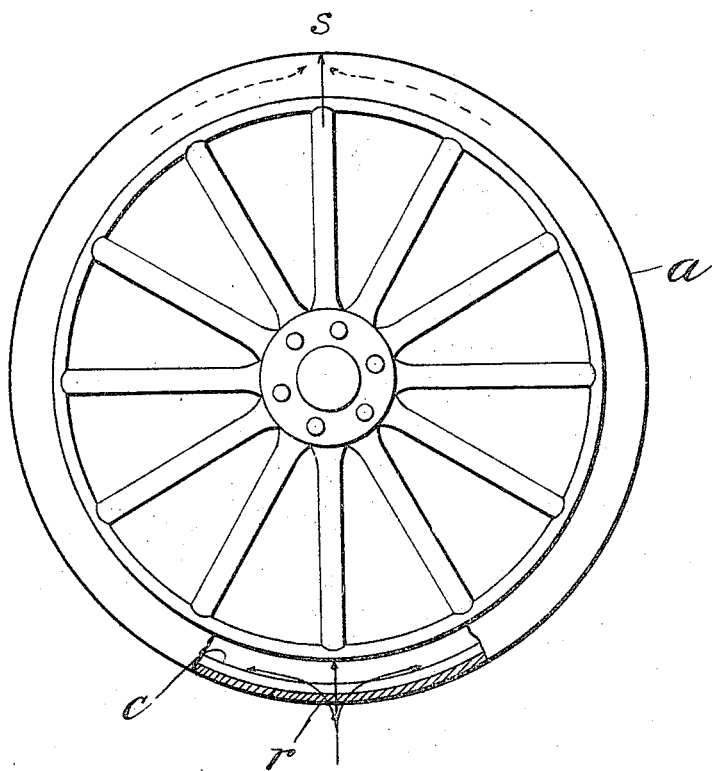

UNITED STATES PATENT OFFICE.

JAMES A. MURPHY AND WILLIAM S. MANNING, OF HOLYOKE, MASSACHUSETTS, ASSIGNORS TO MANNING MANUFACTURING COMPANY, OF SPRINGFIELD, MASSACHUSETTS, A CORPORATION.

PNEUMATIC TIRE.

No. 801,150.     Specification of Letters Patent.     Patented Oct. 3, 1905.

Application filed December 5, 1904. Serial No. 235,600.

*To all whom it may concern:*

Be it known that we, JAMES A. MURPHY and WILLIAM S. MANNING, citizens of the United States of America, residing at Holyoke, in the county of Hampden and State of Massachusetts, have invented new and useful Improvements in Pneumatic Tires, of which the following is a specification.

This invention relates to improvements in pneumatic tires, the object of the invention being to provide in a tire of this character a construction adapted to any type of clencher-tire whereby the inner tube is protected against puncture and whereby the outer casing of the tire is more or less distended in the plane of the wheel by said protective shoe, to the end that the tire-casing, which is normally circular in cross-section, will have an elliptical or oval cross-section, and having these ends in view the invention consists in inserting in a tire-casing of the clencher type a protective shoe in the form of a ring located between the inner tube and the casing, the circumference of which ring is greater than the normal circumference of the inside of the casing at the point of the greatest diameter of the latter.

By the term "clencher-tire" used herein all tires are included in which the casing may be opened for the insertion of an inner tube, whatever may be the mechanical devices or other means whereby they are secured to the rim of the wheel.

It is admitted, of course, that it is not broadly new to insert a protective shoe in the form of a ring located between the inner tube and the casing, and such construction will not be claimed herein.

The present invention is clearly illustrated in the accompanying drawings, in which—

Figure 1:
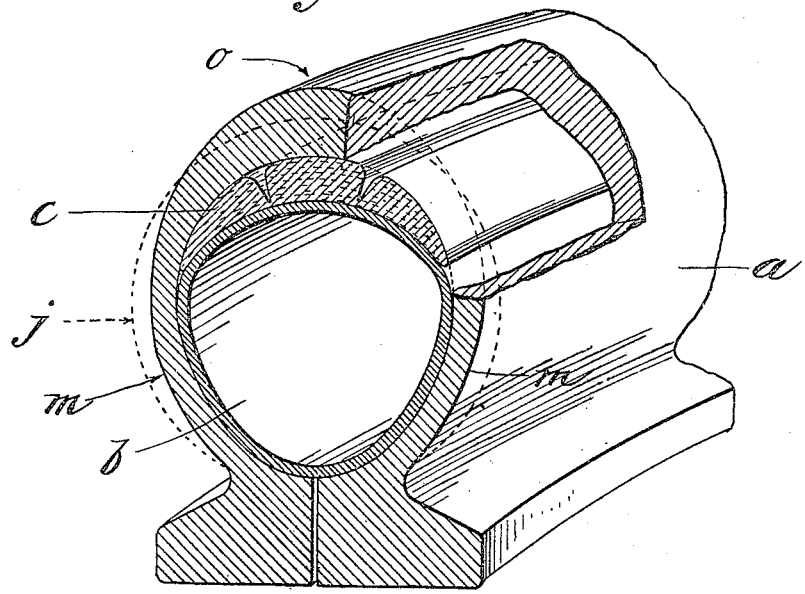
Figure 4:
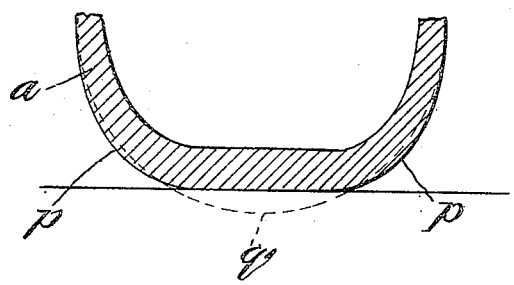
Figure 2:
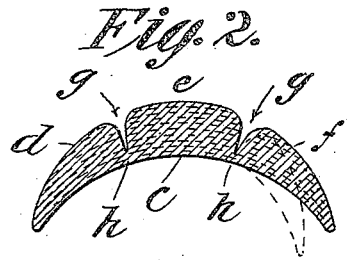
Figure 3:
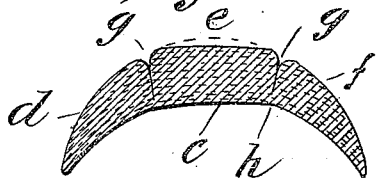

Figure 1 is a sectional perspective view of a portion of a clencher-tire constructed according to this invention. Fig. 2 is a cross-section of the protective shoe in its normal form, and Fig. 3 is a similar view showing the form of the shoe when pressure is applied to one part thereof. Fig. 4 is a cross-sectional view of a portion of a tire with a load put upon it; and Fig. 5 is a side elevation of a wheel having a pneumatic tire thereon, being in the nature of a diagram illustrating the action of the protective rim when applied to the tire according to this invention.

Referring to the drawings, $a$ indicates the outer casing of a tire of the clencher type. $b$ is the inner tube, and $c$ is a protective shoe interposed between the inner tube and the tire at the tread portion of the latter, the casing and the tube being of the usual construction. The shoe $c$ is in the form of a ring molded into such shape in cross-section as will permit it to conform to the interior of the tire more or less closely. Preferably this shoe consists of three parts, as indicated in Figs. 2 and 3, respectively, by $d$, $e$, and $f$, $c$ indicating the structure as a whole. The parts $d$, $e$, and $f$ are produced either by molding the shoe in the form of a crescent, as shown in Fig. 2, and then cutting the circumferential grooves $g$ therein nearly through the shoe, thus leaving a portion $h$ at the bottom of the grooves to constitute a hinge on which any one of the three parts $d$, $e$, or $f$ may swing more or less, or, if desired, the shoe may be molded with these grooves $g$ therein.

The shoe is made of some rubber composition which will be relatively hard and yet with a good spring, and the preferred method of its construction is to build it up of layers of canvas or some similar flexible material put together with rubber and vulcanized to produce the requisite spring and hardness, the grooves $g$ then being turned in the shoe radially thereof. By making a shoe in this manner either side may yield more or less under pressure in either direction toward or from the center of the tire. The principal object of thus constructing the shoe, however, is to permit either one of these annular sections of the shoe to yield in the direction of the center of the tire under the pressure of any element which may have punctured the casing and by thus yielding protect itself against puncture and also deflect the point of the puncturing element. There can be but little of this yielding effect as far as the central portion $e$ of the shoe is concerned; but at this point the shoe is of such thickness that it is practically impossible to force a nail through it; but as far as the sides $d$ and $f$ are concerned (which are thin enough to be punctured) their form and location are such that they can yield locally to a very considerable extent under the influence of pressure from the outside. It may be stated, however, that the function of this shoe as a protection against puncture while it is very important constitutes but one of the two important characteristics of the shoe, its second and most important novel feature consisting in the fact that it is made of greater circumference than the normal interior diameter of the casing in which it is to be located. Thus constructed the shoe constitutes an arch, which before the inner tube has been inflated distends the casing radially, giving the tire the oval or elliptical form shown in full lines in Fig. 1. the dotted line $j$ indicating the normal cross-sectional form of the casing as generally constructed at present, this form, whether the tire be inflated or not, being substantially circular in cross-section.

When the shoe $c$ has been forced into the casing and the latter applied to the tire, the sides of the casing, as at the points $m$, will be drawn inward, due to the tread portion $o$ being forced outwardly, and when the tube $b$ is inflated the cross-sectional form of the tire will undergo but little if any change, for the reason that the sides at $m$ cannot be forced outwardly without a constriction of the shoe $c$, which is practically impossible, owing to the nature of its construction and its arched form. The inner tube therefore serves as an elastic backing for the shoe at all points, making it adhere so closely to the tire-casing that there is practically no friction between the two, the pressure of air being added to the normal friction due to the greater diameter of the shoe relative to the tire. The result of this construction is that at the point of contact of the tire with the ground the indentation thereof is not purely local, as is the case with a tire which is not radially distended.

In tires of the ordinary construction the cross-sectional form of the tire at the point of contact with the road is substantially as shown in Fig. 4—that is to say, the tire at that point flattens out and produces practically a buckling thereof at the two points $p$, the normal shape of the tire being shown by the dotted line $q$. This point of buckling $p$ travels around the tire as the wheel rotates, setting up a constant friction between the layers of the material of which the casing is made, eventually disintegrating that material.

In a tire embodying the present invention there is no flattening thereof at the point of contact with the road, or at least there is not enough to result in the formation of points like the points $p$ on either side thereof, for the reason that the shoe $c$ being of normally greater diameter than the casing it constitutes an outwardly-pushing force in the plane of the wheel in all directions, and the thrust of the load at the point of contact $r$, as shown in Fig. 5, is thus circumferentially distributed in the direction of the arrows to the right and left of this point and through the shoe. This thrust is transmitted to the top of the wheel at the point $s$, as shown, constituting substantially a suspension-tire, and yet owing to the elastic backing of the air-cushion the shoe will yield sufficiently to give the proper cushion effect to the tire without resulting in any marked local indentation at the point of contact with the ground, the yielding movement being distributed by reason of the outwardly-extending spring action exerted by the shoe over an area extending each side of the point of contact far enough to prevent this local indentation. The consequence is that a tire embodying this invention has a far better grip on the road and no road-suction effect is visible, such as is present in tires as generally constructed at the present time, and these advantages are attained without appreciable loss of the cushion effect of the pneumatic tire. Another and very great advantage due to the outwardly-extending spring action of the shoe is that under a load the sides of the tire next to the rim cannot be forced down onto the rim, which results in what is known as "rim-cutting," such action being rendered impossible because there is no appreciable indentation of the tire at the point of contact, whereby the sides thereof close to the rim are bulged outwardly, this bulging effect being rendered impossible without a buckling or centripetal contraction of the shoe.

If desired, the shoe may be made without the circumferential grooves $g$. This will result in making the shoe somewhat stiffer.

Having thus described our invention, what we claim, and desire to secure by Letters Patent of the United States, is—

1. The combination with the casing of a pneumatic tire of the clencher type, of a shoe located in the casing between the latter and the inner tube, the circumference of the shoe being greater than the normal internal circumference of the casing, at the point of the greatest diameter of the latter.

2. The combination with a casing of a pneumatic tire of the clencher type, of a shoe located in the casing between the latter and the inner tube, the circumference of the shoe being greater than the normal internal circumference of the casing, at the point of the greatest diameter of the latter, said shoe having circumferential grooves therein to facilitate the radial movement of one part of said shoe relative to the other.

3. The combination with the casing of a tire, of a shoe located in the latter to distend the same radially independently of air-pressure.

4. In a tire, an annular member constituting an arch to hold the tire under radial distention both in the plane of the tire and transversely of said plane.

5. The combination with the casing of a pneumatic tire, of a shoe therein of greater circumference than, and conforming substantially to, the interior of the casing whereby said casing may be more or less distended radially, and whereby it may constitute a support for the arch of the tire in a plane transversely of the latter.

6. In a tire, a suitable casing and an annular member therein constituting an arch to hold the tire under radial distention in the plane of the tire, said arch being transversely coextensive with the tread portion of the tire.

7. The combination with the elastic casing of a tire, of an annular member in said casing consisting of like material to that of the tire, but harder than the latter, and of greater circumference than the normal interior circumference of the casing at the point of its greatest diameter.

JAS. A. MURPHY.
WM. S. MANNING.

Witnesses:
WM. H. CHAPIN,
K. I. CLEMONS.